US012592500B2

(12) United States Patent
Yang et al.

(10) Patent No.: US 12,592,500 B2
(45) Date of Patent: Mar. 31, 2026

(54) ELECTRICAL CONNECTOR WITH CABLE WIRES SOLDERED TO SOLDERING GROOVES OF TERMINALS

(71) Applicant: JESS-LINK PRODUCTS CO., LTD., New Taipei City (TW)

(72) Inventors: Yun-Chang Yang, New Taipei City (TW); Ming-Wei Chen, New Taipei City (TW); Ming-Jun Xu, New Taipei City (TW); Wen-Fu Liao, New Taipei City (TW)

(73) Assignee: JESS-LINK PRODUCTS CO., LTD., New Taipei City (TW)

( * ) Notice: Subject to any disclaimer, the term of this patent is extended or adjusted under 35 U.S.C. 154(b) by 318 days.

(21) Appl. No.: 18/197,546

(22) Filed: May 15, 2023

(65) Prior Publication Data

US 2024/0332824 A1 Oct. 3, 2024

(30) Foreign Application Priority Data

Mar. 30, 2023 (TW) ................................ 112112291

(51) Int. Cl.
*H01R 4/02* (2006.01)
*H01R 13/6471* (2011.01)

(52) U.S. Cl.
CPC ............ *H01R 4/023* (2013.01); *H01R 4/027* (2013.01); *H01R 13/6471* (2013.01); *H01R 4/02* (2013.01); *H01R 4/021* (2013.01)

(58) Field of Classification Search
CPC .... H01R 4/023; H01R 4/027; H01R 13/6471; H01R 4/02; H01R 4/021
See application file for complete search history.

(56) References Cited

U.S. PATENT DOCUMENTS

2004/0092164 A1* 5/2004 Lee .................... H01R 43/0249 439/606
2019/0052032 A1* 2/2019 Wu ........................ H05K 1/111

FOREIGN PATENT DOCUMENTS

WO WO-8602497 A1 * 4/1986 ............ H01R 4/024

* cited by examiner

*Primary Examiner* — Justin M Kratt
(74) *Attorney, Agent, or Firm* — HDLS IPR SERVICES; Chun-Ming Shih

(57) ABSTRACT

An electric connecting cable includes an insulative seat, multiple terminals and multiple wires corresponding to the terminals. The terminals are buried in the insulative seat. Each terminal has a soldering leg. Each soldering leg penetrates out of the insulative seat. The soldering legs are arranged in a row. Each soldering leg is disposed with a concave soldering groove. Each soldering groove has a notch and a slope outward extended from an edge of the notch. Each wire has a soldering end. Each soldering end is accommodated in corresponding one of the soldering grooves. Each soldering end is separately soldered to corresponding one of the soldering legs. Each wire is extended along a longitudinal direction of corresponding one of the soldering legs soldered thereto.

13 Claims, 10 Drawing Sheets

ELECTRICAL CONNECTOR WITH CABLE WIRES SOLDERED TO SOLDERING GROOVES OF TERMINALS

BACKGROUND

Technical Field

The disclosure relates to an electric connecting cable, particularly to an electric connecting cable having low capacitive wire soldering points.

Related Art

When two adjacent parallel wires transmit high-frequency signals, the capacitive coupling between the currents of the two wires is likely to cause crosstalk interference. Under the premise that the distance between the two wires is fixed, the larger the wire thickness, the higher the capacitance between the two parallel wires, and the more serious the crosstalk interference between the two wires.

The distance between the terminals of a related-art electric connecting cables is extremely small, and the soldering of the wires to the terminals increases the overall thickness of the soldered portions, resulted in enhanced capacitive coupling between terminals at the soldered portions and serious crosstalk interference.

Generally speaking, the soldered place is covered with insulating cladding material. Because the capacitive coupling is enhanced at this place, the insulating cladding material can only use a material with extremely low dielectric constant (Dk) to prevent the capacitive coupling value at this place from exceeding the allowed range. Thus, this increases the cost of materials, and the selection of the insulating cladding materials is extremely limited.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

The disclosure provides an electric connecting cable having low capacitive wire soldering points.

The disclosure provides an electric connecting cable, which includes an insulative seat, multiple terminals and multiple wires corresponding to the terminals. The terminals are buried in the insulative seat. Each terminal has a soldering leg. Each soldering leg penetrates out of the insulative seat. The soldering legs are arranged in a row. Each soldering leg is disposed with a concave soldering groove. Each soldering groove has a notch and a slope outward extended from an edge of the notch. Each wire has a soldering end. Each soldering end is accommodated in corresponding one of the soldering grooves. Each soldering end is soldered to corresponding one of the soldering legs. Each wire is extended along a longitudinal direction of corresponding one of the soldering legs soldered thereto.

In an embodiment of the disclosure, at least one of the soldering legs is correspondingly soldered with the multiple soldering ends.

In an embodiment of the disclosure, each slope is a concave curved surface, and each soldering end is accommodated in the corresponding notch and is supported by the corresponding slope. The multiple soldering ends are jointly supported by corresponding one of the slopes. A diameter of each soldering end is greater than a width of the corresponding notch.

In an embodiment of the disclosure, the electric connecting cable further includes an insulative block in which the soldering ends are buried.

In an embodiment of the disclosure, each wire comprises a core and an insulative layer covering the core, and in each wire, the core is exposed from the soldering end and soldered to the corresponding terminal.

In an embodiment of the disclosure, each terminal is a strip-shaped metal sheet.

In an embodiment of the disclosure, the terminals include multiple grounding terminals connected to each other, and each grounding terminal is transversely extended to be connected with another grounding terminal which is adjacently arranged. Each terminal includes one connecting end, the connecting end of each terminal is arranged corresponding to the soldering leg, and in two of the grounding terminals adjacently arranged, one of the connecting ends on one of the grounding terminals is transversely connected to another connecting end on another one of the grounding terminals, which is adjacently arranged, by a spanning section.

In the electric connecting cable of the disclosure, the soldering leg of each terminal is disposed with the concave soldering groove to accommodate the soldering end of the corresponding wire. The soldering end of the wire is embedded in the soldering leg of the corresponding terminal to be able to reduce the thickness of the soldering structure of the soldering leg and the soldering end. In comparison with the soldering structure of directly soldering the wire to the surface of the terminal, the soldering structure of the wire being embedded in the terminal of the disclosure has a lower thickness and capacitive coupling value. Thus, the structure of the electric connecting cable of the disclosure effectively reduces the crosstalk interference in high-frequency signal transmission.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
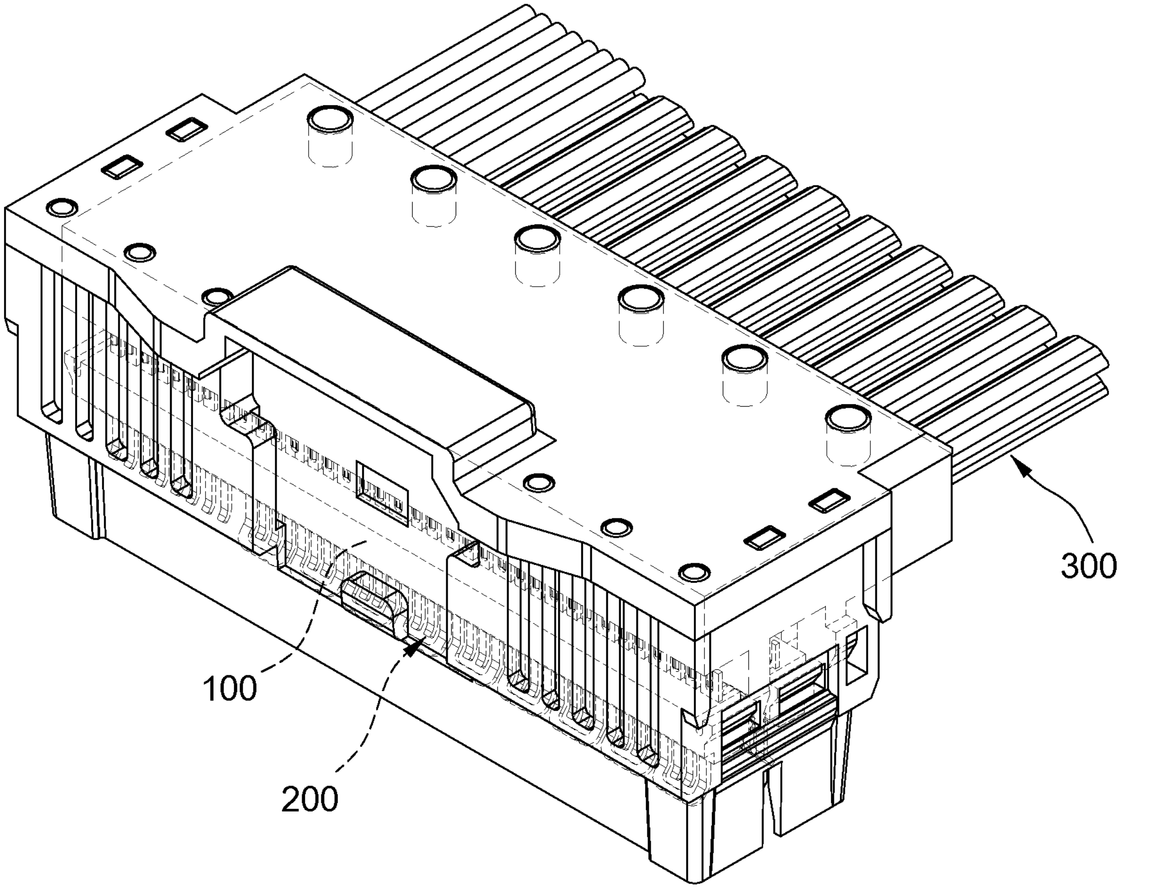
FIG. 1 is a perspective schematic view of the electric connecting cable of the first embodiment of the disclosure.
Figure 2:
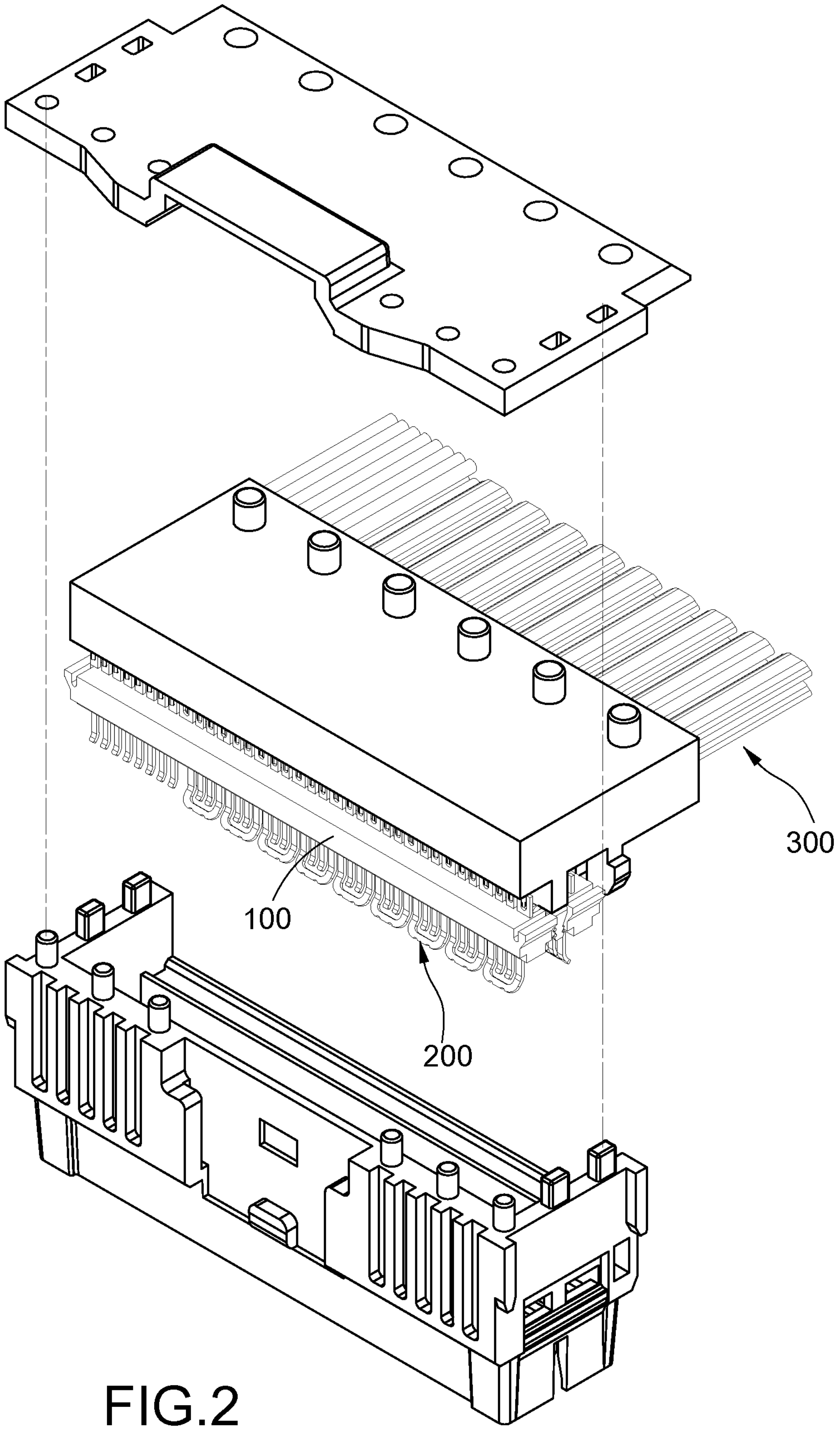
FIG. 2 is an exploded schematic view of the electric connecting cable of the first embodiment of the disclosure.

Please refer to FIGS. 1-2. The first embodiment of the disclosure provides an electric connecting cable, which includes an insulative seat 100, multiple terminals 200 and multiple wires 300 corresponding to the terminals 200.

Figure 3:
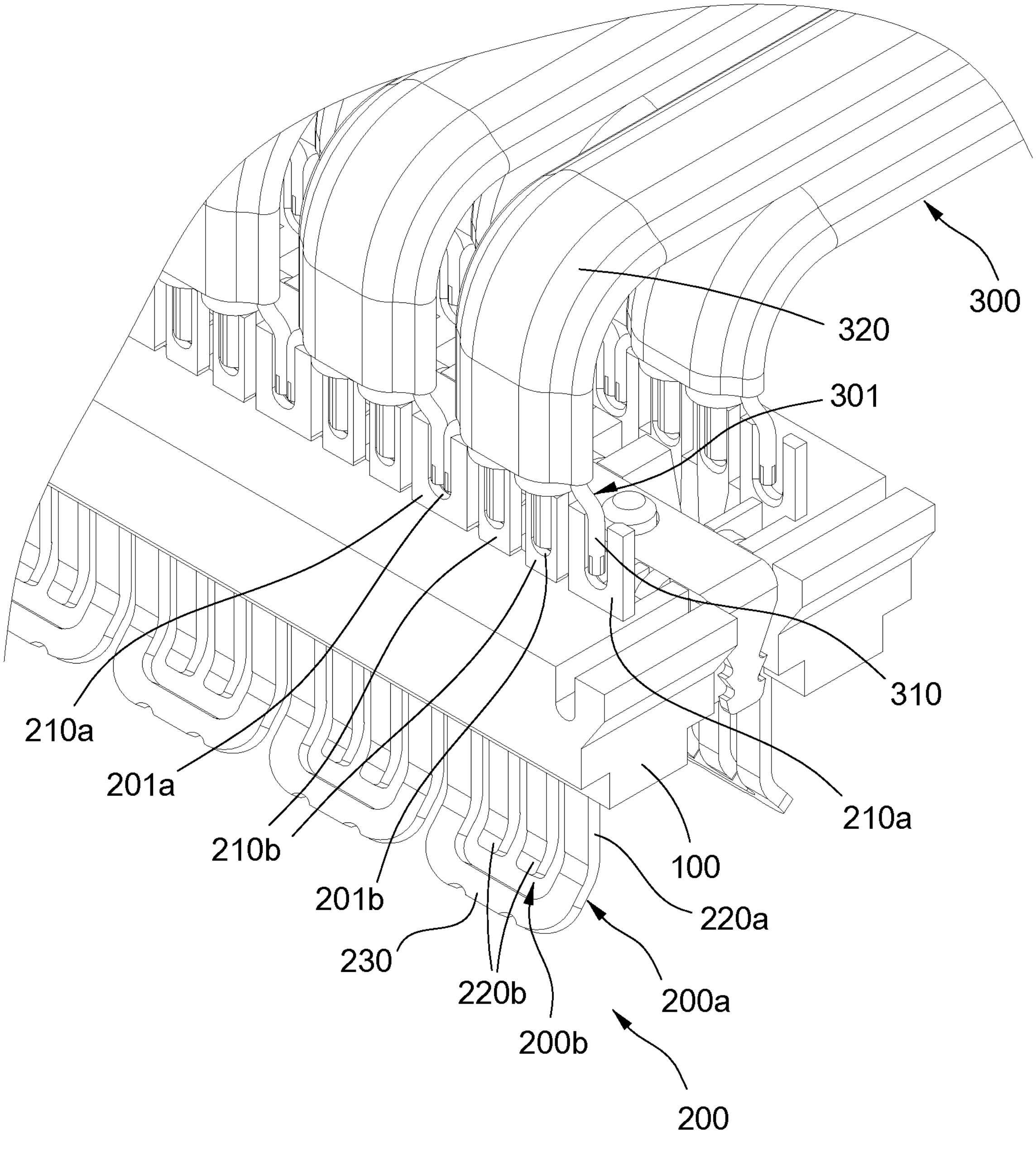
FIG. 3 is a perspective schematic view of the soldering structure between the terminal and the wire of the electric connecting cable of the first embodiment of the disclosure.

Please refer to FIG. 3. The insulative seat 100 is an insulative body 400 made of plastic. The terminals 200 are buried in the insulative seat 100. In detail, the insulative seat 100 covers the terminals 200 by over molding.

Figure 4:
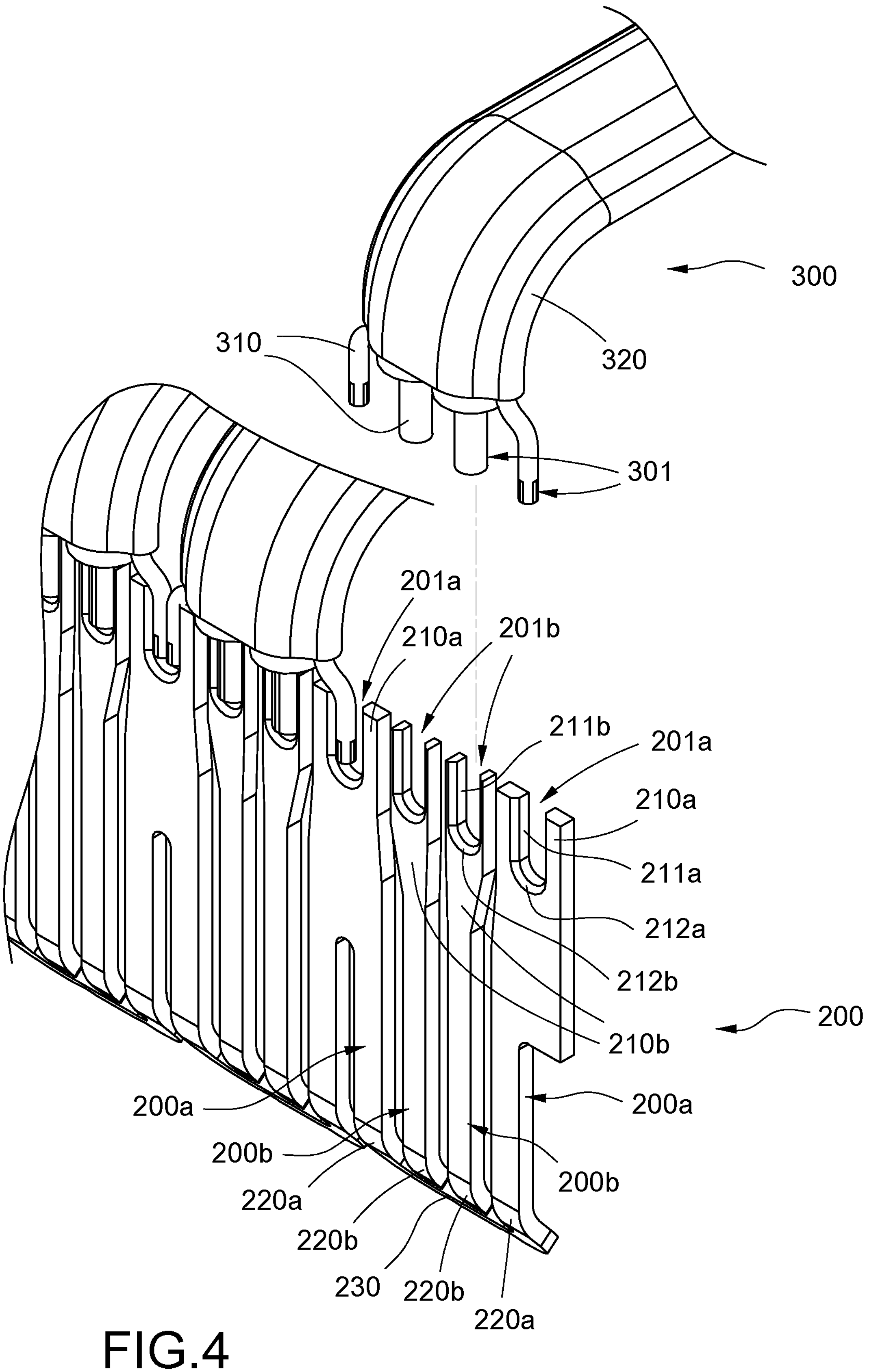
FIG. 4 is a schematic view of the terminal and the wire of the electric connecting cable of the first embodiment of the disclosure.
Figure 5:
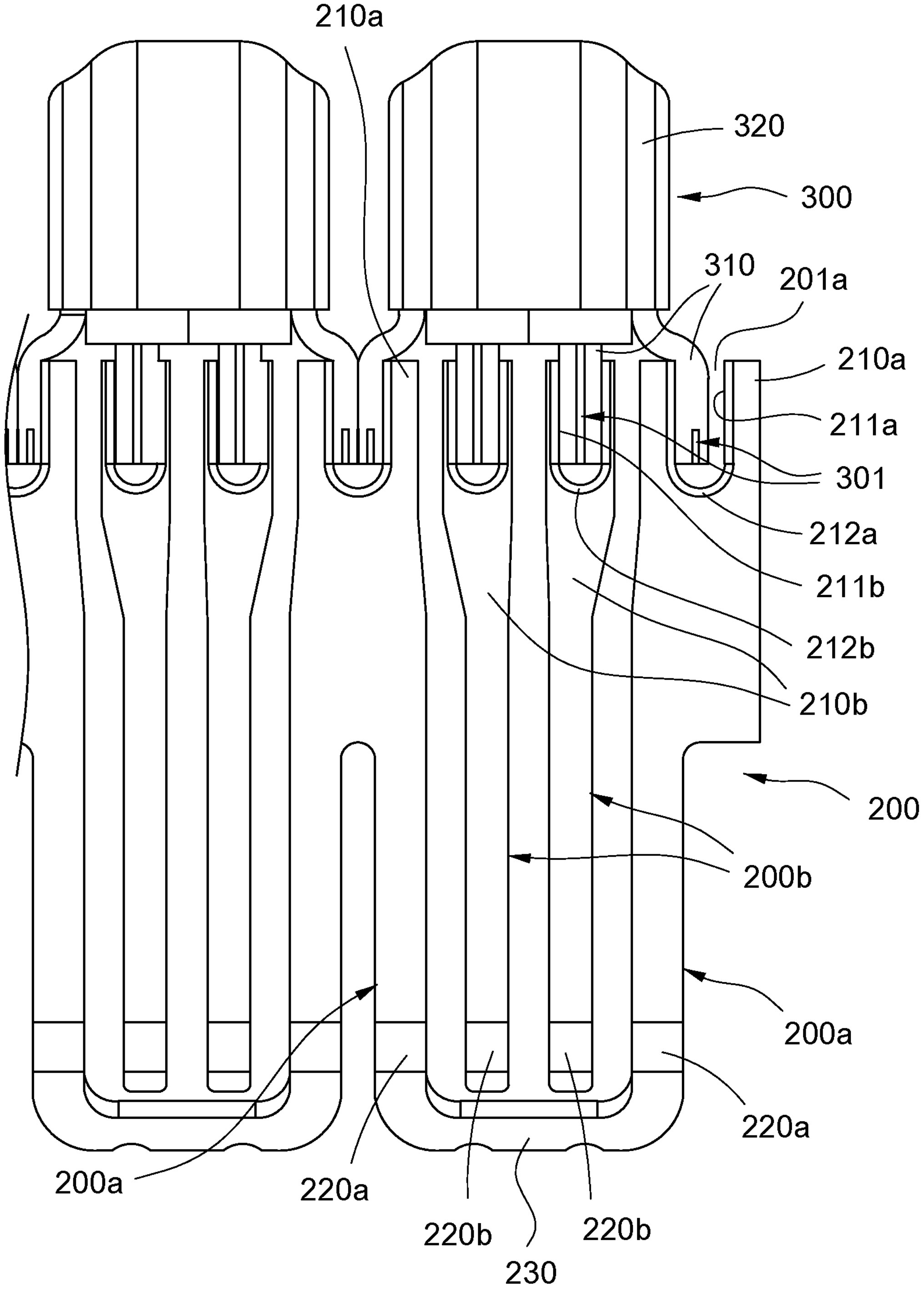
FIG. 5 is a side view of the soldering structure between the terminal and the wire of the electric connecting cable of the first embodiment of the disclosure.
Figure 6:
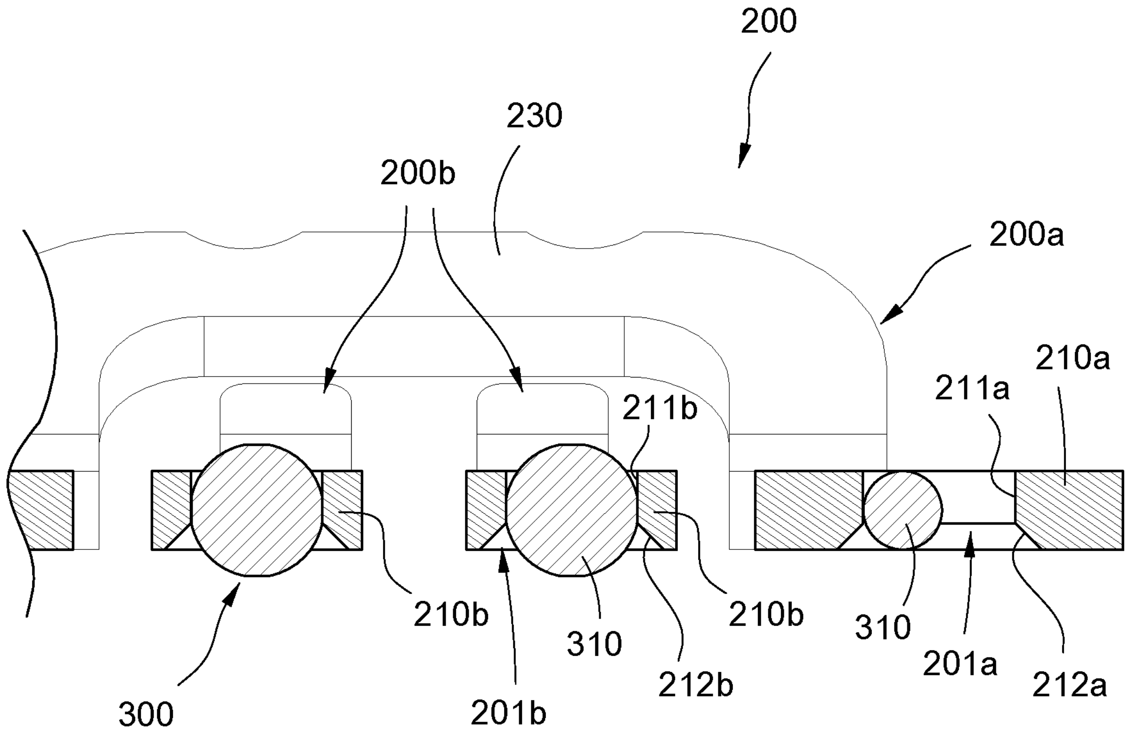
FIG. 6 is a cross-sectional view of the soldering structure between the terminal and the wire of the electric connecting cable of the first embodiment of the disclosure.

Please refer to FIGS. 4-6. Each terminal 200 is a strip-shaped metal sheet. Each terminal 200 has a soldering leg 210*a*/210*b* and at least one connecting end 220*a*/220*b* arranged corresponding to the soldering leg 210*a*/210*b*. In the embodiment, the terminals 200 include multiple grounding terminals 200*a* connected to each other and multiple signal terminals 200*b* separated to each other. The grounding terminals 200*a* has a soldering leg 210*a* and may have one or two forked connecting ends 220*a*. The signal terminals 200*b* has a soldering leg 210*b* and a connecting end 220*b*. Each soldering leg 210*a*, 210*b* and connecting end 220*a*, 220*b* separately penetrates out of two sides of the insulative seat 100. The soldering legs 210*a*, 210*b* are arranged in a row. The connecting ends 220*a*, 220*b* are also arranged in a row. In the embodiment, the grounding terminals 200*a* and the signal terminals 200*b* are alternately arranged. The two connecting ends 220*a* of two of the grounding terminals 200*a*, which are adjacently arranged (or consecutively arranged) (the arranging order of the signal terminals 200*b* but not the arranging order of all terminals 200) but are not closely adjacent in position, are transversely connected by a spanning section 230. Each bridge section 230 crosses at least one of the signal terminals 200*b*.

Each soldering leg 210*a*/210*b* is disposed with a soldering groove 201*a*/201*b*. The soldering groove 201*a*/201*b* is indented on one side of the soldering leg 210*a*/210*b*, and the soldering groove 201*a*/201*b* penetrates to the other side of the soldering leg 210*a*/210*b*. In detail, on each soldering leg 210*a*/210*b*, the soldering groove 201*a*/201*b* has a notch 211*a*/211*b* therein and a slope 212*a*, 212*b*. The notch 211*a*, 211*b* are located in the bottom of the soldering groove 201*a*/201*b* to penetrate through the soldering leg 210*a*/210*b*. The slope 212*a*/212*b* is outward extended from an edge of the notch 211*a*/211*b* to a surface of the opposite side of the soldering groove 201*a*/201*b*. In the embodiment, each slope 212*a*, 212*b* is a plane. On each soldering leg 210*a*/210*b*, the soldering groove 201*a*/201*b* is formed by stamping, the notch 211*a*/211*b* is firstly formed and then the slope 212*a*/212*b* is formed. When stamping the slope 212*a*/212*b*, the metal material may be pressed into the notch 211*a*/211*b* to prevent the metal material from being outward pressed to cause deformation of the terminal 200, which does not meet the desired size.

Please refer to FIGS. 3-6. Each wire 300 is soldered to corresponding one of the terminals 200. Each terminal 200 may be correspondingly soldered to one or more wires 300. In the embodiment, each signal terminal 200*b* is correspondingly soldered to one of the wires 300. Each grounding terminal 200*a* is correspondingly soldered to two of the wires 300. Each wire 300 has a soldering end 301. Each wire 300 has a core 310 and an insulative layer 320 covering the core 310. In each wire 300, the core 310 is exposed from the soldering end 301 and soldered to the corresponding terminal 200. Each wire 300 is soldered to corresponding one of the soldering legs 210*a*/210*b* by the soldering end 301. Each soldering end 301 is accommodated in corresponding one of the soldering grooves 201*a*/201*b*. Each wire 300 is extended along a longitudinal direction of corresponding one of the soldering legs 210*a*/210*b* soldered thereto. In detail, a diameter of each soldering end 301 is less than a width of the corresponding notch 211*a*/211*b*. Each soldering end 301 is accommodated in corresponding one of the notches 211*a*/211*b*. On the soldering leg 210*a* of each grounding terminal 200*a*, the corresponding multiple soldering ends 301 may be jointly accommodated in the same notch 211*a*. When each soldering leg 301 is accommodated in the corresponding notch 211*a*, 211*b*, each slope 212*a*/212*b* is used to guide each soldering end 301 to enter the corresponding notch 211*a*/211*b*.

Figure 7:
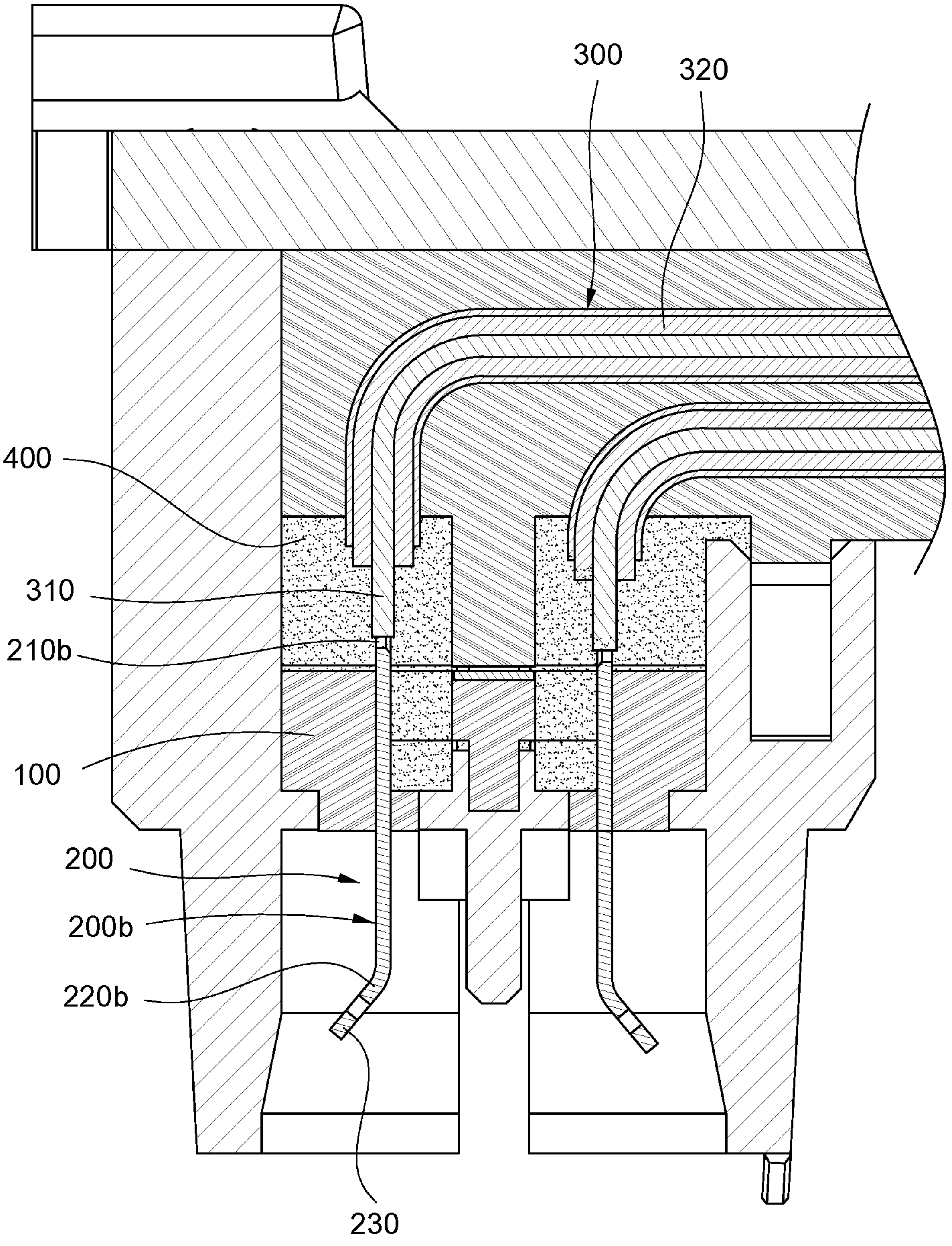
FIG. 7 is a longitudinally sectional view of the soldering structure between the terminal and the wire of the electric connecting cable of the first embodiment of the disclosure.

Please refer to FIG. 7. In the embodiment, the electric connecting cable further includes an insulative block 400. The soldering ends 301 and the soldering legs 210*a*, 210*b* are buried in the insulative block 400. In detail, the insulative block 400 is formed to cover the soldering end 301 and the soldering leg 210*a*, 210*b* by over molding.

Figure 8:
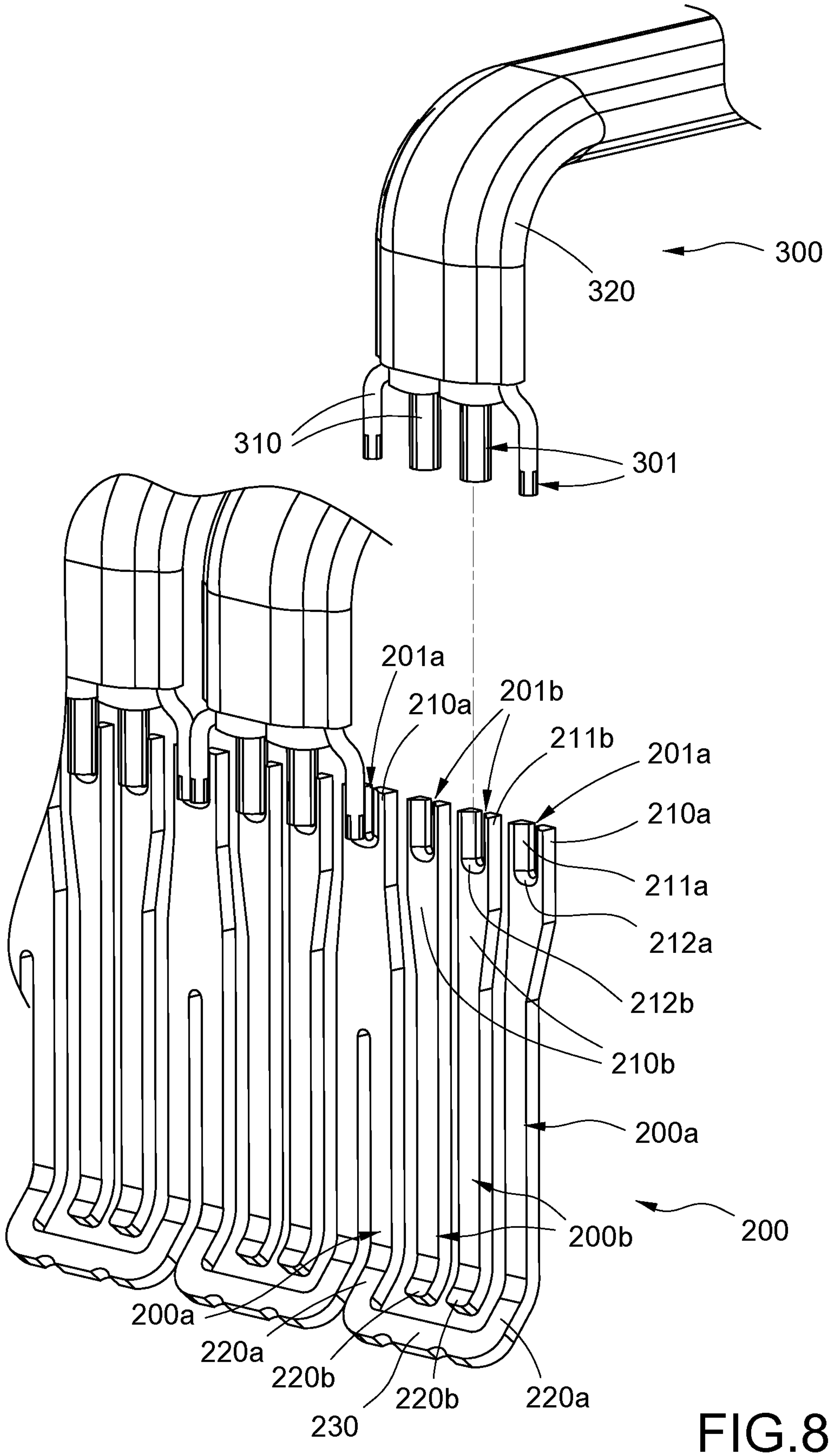
FIG. 8 is a schematic view of the terminal and the wire of the electric connecting cable of the second embodiment of the disclosure.
Figure 9:
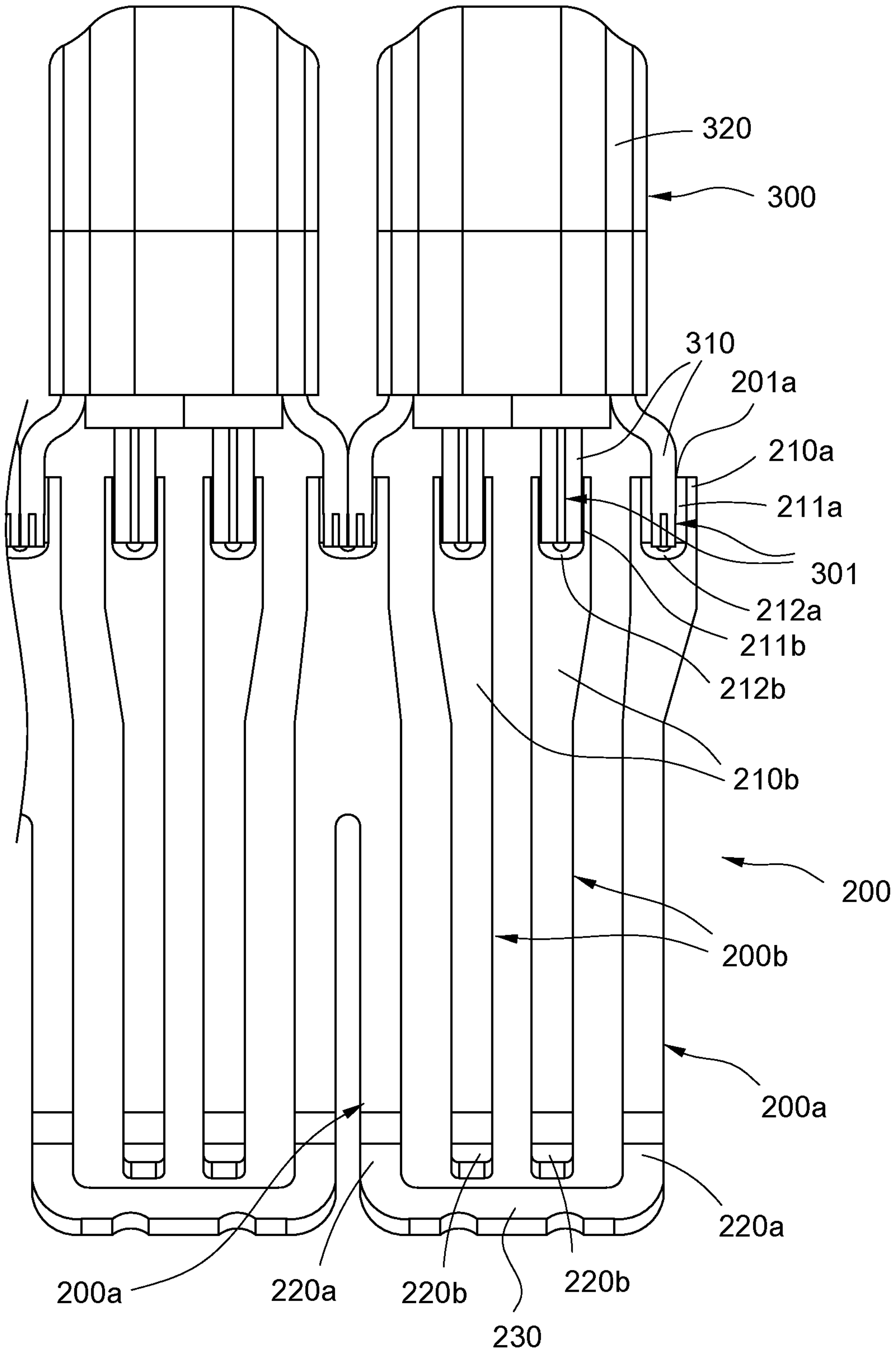
FIG. 9 is a side view of the soldering structure between the terminal and the wire of the electric connecting cable of the second embodiment of the disclosure.
Figure 10:
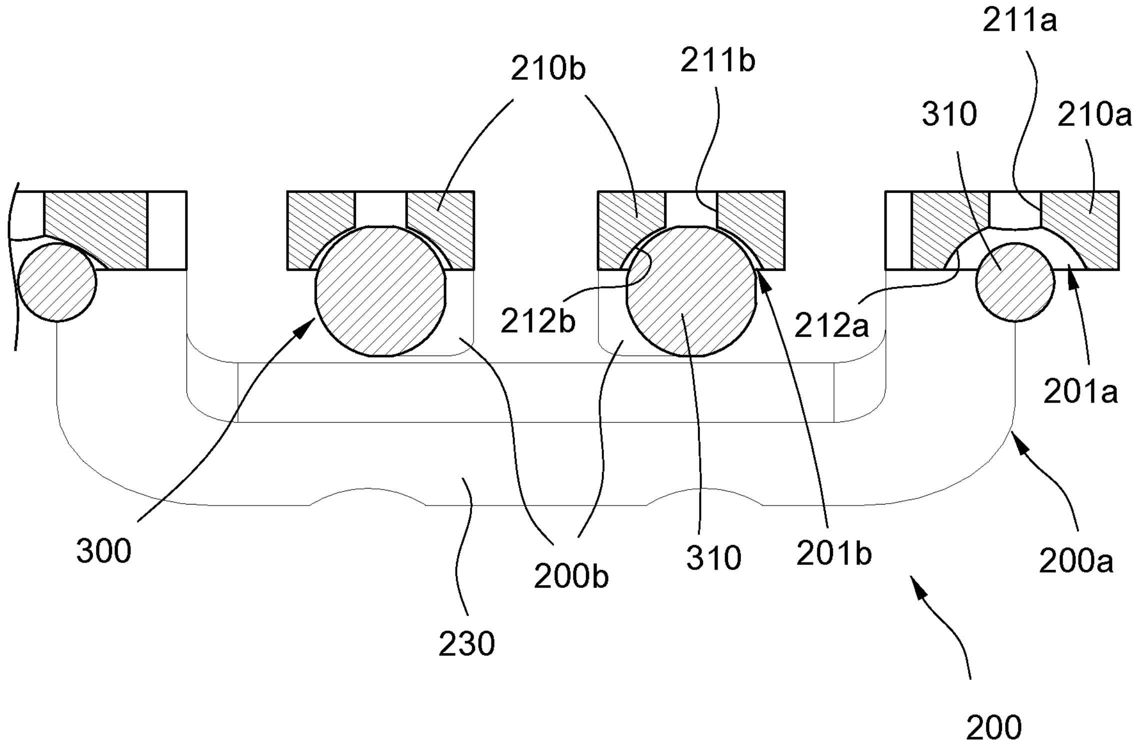
FIG. 10 is a cross-sectional view of the soldering structure between the terminal and the wire of the electric connecting cable of the second embodiment of the disclosure.

Please refer to FIGS. 8-10. The second embodiment of the disclosure provides an electric connecting cable, which includes an insulative seat 100, multiple terminals 200 and multiple wires 300 corresponding to the terminals 200. The terminals 200 are buried in the insulative seat 100. Each terminal 200 has a soldering leg 210*a*/210*b*. Each soldering leg 210*a*/210*b* penetrates out of the insulative seat 100. The soldering legs 210*a*, 210*b* are arranged in a row. Each soldering leg 210*a*/210*b* is disposed with a concave soldering groove 201*a*/201*b*. Each soldering groove 201*a*/201*b* has a notch 211*a*/211*b* therein and a slope 212*a*/212*b* outward extended from an edge of the notch 211*a*/211*b*. Each wire 300 has a soldering end 301. Each soldering end 301 is accommodated in the corresponding soldering groove 201*a*, 201*b*. Each soldering end 301 is soldered to corresponding one of the soldering legs 210*a*/210*b*. Each wire 300 is extended along a longitudinal direction of corresponding one of the soldering legs 210*a*/210*b* soldered thereto.

The structure of the insulative seat 100 and each wire 300 of the electric connecting cable of the embodiment is the same as the first embodiment shown in FIGS. 1-7, so the same description is omitted for brevity. This embodiment differs from the first embodiment by the soldering groove 201*a*/201*b* and the connection relationship of the wire 300 and each soldering groove 201*a*/201*b*. The structure of the rest of each terminal 200 is the same as the first embodiment shown in FIGS. 1-7. In the embodiment, each slope 212*a*/212*b* is a concave curved surface. Each soldering end 301 is accommodated in the corresponding notch 211*a*, 211*b* and is supported by the corresponding slope 212*a*, 212*b*. In the embodiment, a diameter of each soldering end 301 is greater than a width of the corresponding notch 211*a*, 211*b*. In the soldering groove 201*a*, 201*b* on the soldering end 301 of the grounding terminal 200*a*, the corresponding soldering end 301 may be jointly supported by its slope 212*a*, 212*b* without falling in the notch 211*a*, 211*b* of this soldering groove 201*a*, 201*b*. The soldering groove 201*a*/201*b* is formed by stamping, the notch 211*a*, 211*b* is firstly formed and then the slope 212*a*, 212*b* is formed. When stamping the slope 212*a*, 212*b*, the metal material may be pressed into the notch 211*a*, 211*b* to prevent the metal material from being outward pressed to cause deformation of the terminal 200, which does not meet the desired size.

In the electric connecting cable of the disclosure, the soldering leg 210*a*, 210*b* of each terminal 200 is disposed with the concave soldering groove 201*a*, 201*b* to accommodate the soldering end 301 of the corresponding wire 300. The soldering end 301 of the wire 300 is embedded in the soldering leg 210*a*, 210*b* of the corresponding terminal 200 to be able to reduce the thickness of the soldering structure of the soldering leg 210*a*, 210*b* and the soldering end 301. In comparison with the soldering structure of directly soldering the wire 300 to the surface of the terminal 200, the soldering structure of the wire 300 being embedded in the terminal 200 of the disclosure has a lower thickness and capacitive coupling value. Thus, the structure of the electric connecting cable of the disclosure effectively reduces the crosstalk interference in high-frequency signal transmission. The insulative block 400 covering the soldering end 301 and the soldering leg 210*a*, 210*b* does not need to use a material with extremely low dielectric constant (Dk) to manufacture.

While this disclosure has been described by means of specific embodiments, numerous modifications and variations could be made thereto by those skilled in the art without departing from the scope and spirit of this disclosure set forth in the claims.

What is claimed is:

1. An electric connecting cable comprising:

an insulative seat;

multiple terminals, buried in the insulative seat, each terminal comprising a soldering leg, the soldering leg penetrating out of the insulative seat, multiple soldering legs arranged in a row, each soldering leg comprising a soldering groove disposed concave into one side of the soldering leg, the soldering groove comprising a notch penetrating a bottom of the soldering groove to another side of the soldering leg and a slope defined on an internal surface of the soldering groove, and the slope outwardly extended from an edge of the notch toward an opening of the soldering groove; and multiple wires, disposed corresponding to the terminals, each wire comprising a soldering end, the soldering end accommodated correspondingly in the soldering groove, the soldering end soldered to the soldering leg, and each wire extended along a longitudinal direction of the soldering leg being soldered, wherein the slope is a concavely curved surface, and the soldering end is accommodated in the notch and is supported by the slope.

2. The electric connecting cable of claim 1, wherein at least one of the soldering legs is correspondingly soldered with multiple soldering ends.

3. The electric connecting cable of claim 1, wherein multiple soldering ends are jointly supported by the slope.

4. The electric connecting cable of claim 1, wherein a diameter of the soldering end is greater than a width of the notch.

5. The electric connecting cable of claim 1, wherein the slope is a plane, and the soldering end is accommodated in the notch.

6. The electric connecting cable of claim 5, wherein multiple soldering ends are jointly accommodated in the notch.

7. The electric connecting cable of claim 5, wherein a diameter of the soldering end is less than a width of the notch.

8. The electric connecting cable of claim 1, further comprising an insulative block, wherein the soldering end is buried in the insulative block.

9. The electric connecting cable of claim 1, wherein each wire comprises a core and an insulative layer covering the core, and in each wire, the core is exposed from the soldering end and soldered to one of the terminals.

10. The electric connecting cable of claim 1, wherein each terminal is a strip-shaped metal sheet.

11. The electric connecting cable of claim 1, wherein the terminals comprise multiple grounding terminals connected to each other, and each grounding terminal is transversely extended and connected with another grounding terminal arranged adjacently.

12. The electric connecting cable of claim 11, wherein each terminal comprises at least one connecting end, the connecting end of each terminal is arranged corresponding to the soldering leg, and in two of the grounding terminals adjacently arranged, the connecting end on one of the grounding terminals is transversely connected to another connecting end on another one of the grounding terminals adjacently arranged by a spanning section.

13. The electric connecting cable of claim 12, wherein the terminals comprise multiple signal terminals separated from each other, and the spanning section crosses at least one signal terminal.

* * * * *